United States Patent
Dondoshansky et al.

(10) Patent No.: US 9,593,978 B2
(45) Date of Patent: Mar. 14, 2017

(54) DEVICE AND METHOD FOR MEASURING MASS FLOW RATE OF FLUIDS

(71) Applicants: Alexander Dondoshansky, Moscow (RU); Peter Mouler, Irvine, CA (US)

(72) Inventors: Alexander Dondoshansky, Moscow (RU); Peter Mouler, Irvine, CA (US)

(73) Assignee: ARGOSY TECHNOLOGIES, Palm Desert, CA (US)

( * ) Notice: Subject to any disclaimer, the term of this patent is extended or adjusted under 35 U.S.C. 154(b) by 980 days.

(21) Appl. No.: 13/660,107

(22) Filed: Oct. 25, 2012

(65) Prior Publication Data
US 2014/0122008 A1   May 1, 2014

(51) Int. Cl.

| | |
|---|---|
| G01F 1/075 | (2006.01) |
| G01F 1/58 | (2006.01) |
| G01F 1/64 | (2006.01) |
| G01F 25/00 | (2006.01) |
| G01F 1/84 | (2006.01) |
| G01F 1/00 | (2006.01) |
| G01F 1/66 | (2006.01) |

(52) U.S. Cl.
CPC .......... G01F 25/0007 (2013.01); G01F 1/075 (2013.01); G01F 1/84 (2013.01); G01F 1/00 (2013.01); G01F 1/58 (2013.01); G01F 1/64 (2013.01); G01F 1/66 (2013.01)

(58) Field of Classification Search
CPC .......... G01F 25/0007; G01F 1/00–1/86; G06F 17/11
USPC .................................. 702/100; 73/1.16, 702
See application file for complete search history.

(56) References Cited

U.S. PATENT DOCUMENTS

| | | | | |
|---|---|---|---|---|
| 4,043,196 | A * | 8/1977 | Trageser | 73/204.14 |
| 2005/0229719 | A1* | 10/2005 | Rieder et al. | 73/861.357 |
| 2011/0023626 | A1* | 2/2011 | Weinstein | 73/861.357 |

* cited by examiner

Primary Examiner — Mischita Henson
Assistant Examiner — Christine Liao
(74) Attorney, Agent, or Firm — Henry M. Feiereisen LLC.

(57) ABSTRACT

In a device and method for measuring a mass flow rate of a fluid, a housing has two hollow pipes communicating with one another and having a fluid inlet and a fluid outlet, an electromagnetic excitation unit excites vibrations in the hollow pipes, two electromagnetic adapters are associated correspondingly with the two pipes and provides signals which are proportional to a speed of vibrations of the pipes of said housing, and an electronic block connected with the electromagnetic excitation unit and with the electromagnetic adapters determines a mass flow rate of a fluid, a correction associated with inclusions in the fluid and constituted by a ratio of a voltage amplitude of the adapters and a voltage amplitude of excitation of vibrations by the electromagnetic excitation unit, and a corrected mass flow rate of the fluid based on the determined mass flow and the determined correction.

2 Claims, 1 Drawing Sheet

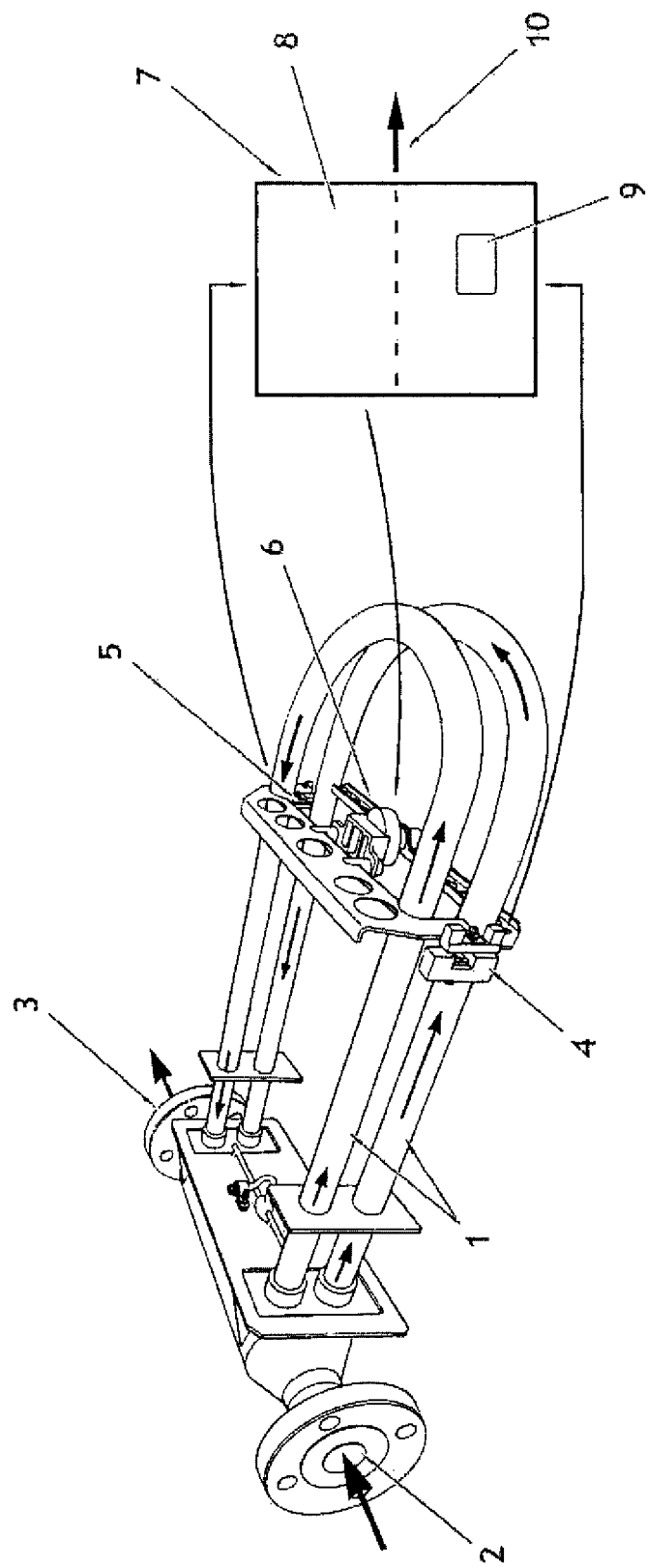

DEVICE AND METHOD FOR MEASURING MASS FLOW RATE OF FLUIDS

CROSS REFERENCE TO A RELATED APPLICATION

This patent application contains some subject matter which corresponds to the subject matter disclosed in Russian patent application no. 2012110955 (016509) filed on Mar. 23, 2012, which is incorporated in this application by reference thereto.

The present application claims its priority from the above identified Russian application under 35 USC 119 (a)-(d).

BACKGROUND OF THE INVENTION

The present invention relates to devices and method for measuring mass flow rates of fluids, such as liquids and gases.

Devices and methods of the above mentioned general type are known in the art. One of the known vibration devices for measuring mass flow rates is disclosed for example in U.S. Pat. No. 4,096,746 and operates on the basis of measurement of Coriolis forces, which are generated during vibrations of a console-type mounted part of a pipeline.

Vibration mass flow rate meters which are provided with two U-shaped pipes are disclosed in U.S. Pat. No. 4,491,025. The pipes are mounted in a rigid housing and the device is provided with a unit for exciting vibrations and adapters for receiving signals from the vibrating pipes, both arranged on the pipes. An electronic block measures a difference of phases in time units between voltages on the adapters and indicates a mass flow rate in corresponding units.

Mass force (Coriolis force) flow rate meters are also known in particular for measurements of a flow rate of two-phase mediums. They are disclosed for example in publication P. P. KREMLEVSKY. "Flow Rate Meters and Quantity Counters", L, "Machine Building", 1989, pp. 636-637.

Also, vibration mass flow rate measuring devices are known, which have a housing with the U-shaped pipes and the vibration excitation unit and adapter units located on the pipes, which provide correction of mass flow rate of liquids with gas and other inclusions, based on preservation of value of a flow rate during obtaining of a signal-change of density and/or voltage on the excitation unit, as disclosed in Hanus Henry, "Self-Validating Digital Coriolis Mass Flow Meter", Computing Engineering Journal, October 2000, and Rota MASS 3 Series Coriolis—Mass Flowmeter. Instruction Manual, 2010.

The U-shaped pipes, under the action of the excitation unit, perform vibrations with own frequency in a counter phase. During this process Coriolis acceleration is generated in the liquid which moves in the pipes (proportionally to a product of transmission speed of liquid and liquid speed) and corresponding forces which act on the pipes. These forces lead to generation of a phase difference on the adapters, which is proportional to the mass flow rate. When the liquid contains gaseous or other inclusions with density that is different from density of the liquid, not whole mass of liquid and inclusions takes part in transitional movement (caused by vibrations of the pipe). In other words, contrary to single phase liquid, transitional speeds of different phases (inclusions) will be different, which is known as "phase sliding"). A summarized transitional speed of liquid and inclusions will be lower than a speed of a homogenous liquid, and therefore Coriolis acceleration, phase difference and indicated mass flow rate will be lower. In other words a negative error of flow rate measurement occurs.

Correction of the error of flow rate is carried out by preservation of value of flow rate from a moment of appearance of gaseous and other inclusions to a moment of restoring homogeneity of liquid. A signal for turning on and turning of a correction is a change of density and voltage at the excitation unit. Thereby the error of flow rate measurements in presence of (short-term) gaseous and other inclusions is reduced.

The above described correction is however possible only in the case of short-term influence of inclusions in liquid. It also does not take into consideration a possibility of real reduction of mass flow rate in presence of gaseous inclusions due to increase of hydraulic resistance. Finally, instability of "zero" point of correction function, because a mode of a homogenous liquid is rare while a mode with more or less inclusions is more often, can lead to significant errors in correction of a mass flow rate

SUMMARY OF THE INVENTION

Accordingly it is an object of the present invention to provide a device and a method for measuring mass flow rates of fluids, which are further improvements of the known devices and methods.

In keeping with these objects and with others which will become apparent hereinafter, one feature of the present invention resides, briefly stated in a device for measuring a mass flow rate of a fluid, which has a housing with two hollow pipes communicating with one another and having a fluid inlet and a fluid outlet, an electromagnetic excitation unit exciting vibrations in said hollow pipes of said housing, two electromagnetic adapters associated correspondingly with said two pipes of said housing and providing signals which are proportional to a speed of vibrations of said pipes of said housing, and an electronic block connected with said electromagnetic excitation unit and with said electromagnetic adapters and determining a mass flow rate of a fluid, determining a correction associated with inclusion in the fluid and constituted by a ratio of a voltage amplitude of said adapters and a voltage amplitude of excitation of vibrations by said electromagnetic excitation unit, and determining a corrected mass flow rate of the fluid based on said determined mass flow and said determined correction.

Another feature of the present invention resides in that said electronic block is configured to determine said correction, in which an argument of a function of said correction for example is:

$$X = \frac{A}{Ao} - 1$$

wherein

X is argument of a function of the correction,

A is ratio of voltage amplitude on the adapters to excitation voltage when there are inclusions in the fluid, and Ao is a ratio of voltage amplitude on the adapters to excitation voltage when there are no inclusions in the fluid.

The electronic block is also configured to determine the corrected mass flow rate as follows:

$$Go = G/[1+e(X)]$$

wherein

Go is the corrected mass flow rate,

G is the determined flow rate before correction, and e (X) is error caused by inclusions.

Also, the electronic block is configured to determine the error caused by inclusion as follows:

$$e(X) = aX(c-X) - bX \frac{d-X^2}{g^n}$$

wherein a, b, c, d are constant coefficients which depend on type and size of sensors, $$g = \frac{Go}{G\max}$$

which is a relative mass flow rate, G max is a maximum flow rate, n is degree of g equal to 1.43.

Another feature of the present invention resides in a method of measuring a mass flow rate of a fluid, comprising the steps of providing a housing with two hollow pipes communicating with one another and having a fluid inlet and a fluid outlet, exciting vibrations in said hollow pipes of said housing by an electromagnetic excitation unit, associating two electromagnetic adapters correspondingly with said two pipes of said housing and providing by them signals which are proportional to a speed of vibrations of said pipes of said housing, and connecting an electronic block with said electromagnetic excitation unit and with said electromagnetic adapters and determining by the electronic block a mass flow rate of a fluid, a correction associated with inclusion in the fluid and constituted by a ratio of a voltage amplitude of said adapters and a voltage amplitude of excitation of vibrations by said electromagnetic excitation unit, and a corrected mass flow rate of the fluid based on said determined mass flow and said determined correction.

The above mentioned steps of the inventive method are carried out substantially as described hereinabove in regard to the operation of the electronic block of the inventive device.

When the device is designed and the method is performed in accordance with the present invention, they provide measurements of a mass flow rate of fluids of significantly higher quality and accuracy than the known devices and methods.

The novel features of the present invention are set forth in particular in the appended claims. The invention itself however, both as to its construction and operation, will be best understood from the following description of the preferred embodiments, which is a accompanied by the following drawings.

BRIEF DESCRIPTION OF THE DRAWINGS

FIG. 1 of the drawings is a view schematically showing a device for measuring a mass flow rate of fluids in accordance with the present invention, with which a method for measuring a mass flow rate of fluids in accordance with the present invention is carried out.

DESCRIPTION OF THE PREFERRED EMBODIMENTS

FIG. 1 shows a device for measuring a mass flow rate of fluids, such as liquids and gases, which is provided with new inventive features and utilizes a new inventive method in accordance with the present invention. The inventive device for measuring a mass flow rate of fluids has a housing with two U-shaped pipes 1.

Reference numerals 2 and 3 identify correspondingly an inlet for a fluid and an outlet of a fluid. An inlet electromagnetic adapter is identified with reference numeral 4 and an outlet electromagnetic adapter is identified with reference numeral 5. The electromagnetic adapters 4 and 5 have identical magnet-coil designs. They generate electrical signals which are proportional to a speed of displacement of branches 1 of the device relative to one another.

The device further has an electromagnetic unit 6 which excite vibrations and has a design substantially corresponding to the design of the electromagnetic adapters 4 and 5. It forms a system of self-excitation of the branches 1 of the device. The device further has an electronic block which is identified with reference numeral 7. The electronic block has inputs connected with the electromagnetic adapters 4 and 5 and an output connected with the electromagnetic excitation unit 6.

During operation a fluid flows through the pipes 1 which vibrate with their own frequency due to the electromagnetic excitation unit 6 and the electromagnetic adapters 4 and 5 which form together an auto-vibration system. The electromagnetic adapters 4 and 5 provide a back link for excitation of an auto-vibration process, and for obtaining a signal which is proportional to the mass flow rate of fluids.

The electronic block 7 connected with the electromagnetic excitation unit 6 and with the electromagnetic adapters 4 and 5 determines a mass flow rate of a fluid, a correction associated with inclusions in the fluid and constituted by a ratio of a voltage amplitude of the adapters 4 and 5 and a voltage amplitude of excitation of vibrations by the electromagnetic excitation unit 6, and determines a corrected mass flow rate of the fluid based on the determined mass flow and the determined correction. The inclusions in a liquid can be for example gas bubbles, sand etc., while the inclusions in a gas can be liquid bubbles, sand etc.

In particular, the electronic block 7 is configured so that it determines the correction, in which an argument of a function of the correction is:

$$X = \frac{A}{Ao} - 1$$

wherein

X is argument of a function of the correction,

A is ratio of voltage amplitude on the adapters to excitation voltage when there are inclusions in the fluid, and Ao is a ratio of voltage amplitude on the adapters to excitation voltage when there are no inclusions in the fluid.

The electronic block 7 determines the corrected mass flow rate as follows:

$$Go = G[1+e(X)]$$

wherein

Go is the corrected mass flow rate,

G is the determined flow rate before correction, and e (X) is error caused by inclusions.

The error caused by inclusions is determined by the electronic block as $$e(X) = aX(c - X) - bX\frac{d - X^2}{g^n}$$

wherein a, b, c, d are constant coefficients which depend on type and size of sensors, $$g = \frac{Go}{G\max}$$

which is a relative mass flow rate, G max is a maximum flow rate, n is degree of g equal to 1.43.

The corrected mass flow rate of liquid determined by the electronic block 7 is outputted as a measurement result via data output 8.

The invention is not limited to the details shown since various modifications and structural changes are possible without departing from the spirit of the invention.

What is desired to be protected by Letters Patent is set in particular in the appended claims:

1. A device for measuring a mass flow rate of a fluid, comprising
    a housing with two hollow pipes communicating with one another and having a fluid inlet and a fluid outlet;
    an electromagnetic excitation unit exciting vibrations in said hollow pipes of said housing;
    two electromagnetic adapters associated correspondingly with said two pipes of said housing and providing signals which are proportional to a speed of vibrations of said pipes of said housing; and
    an electronic block connected with said electromagnetic excitation unit and with said electromagnetic adapters and determining a mass flow rate of a fluid,
    determining a correction associated with inclusion in the fluid and constituted by a ratio of a voltage amplitude of said adapters and a voltage amplitude of excitation of vibrations by said electromagnetic excitation unit, and determining a corrected mass flow rate of the fluid based on said determined mass flow and said determined correction,
    wherein said electronic block is configured to determine said correction, in which an argument of a function of said correction is:

$$X = \frac{A}{Ao} - 1$$

wherein
        X is argument of a function of the correction,
        A is ratio of voltage amplitude on the adapters to excitation voltage when there are inclusions in the fluid, and
        Ao is a ratio of voltage amplitude on the adapters to excitation voltage when there are no inclusions in the fluid,
            wherein said electronic block is configured to determine the corrected mass flow rate as follows:

$$Go = G[1 + e(X)]$$

wherein
        Go is the corrected mass flow rate,
        G is the determined flow rate before correction, and e (X) is error caused by inclusions,
    wherein said electronic block is configured to determine the error caused by inclusion as follows:

$$e(X) = aX(c - X) - bX\frac{d - X^2}{gn}$$

wherein a, b, c, d are constant coefficients which depend on type and size of sensors, $$g = \frac{Go}{G\max}$$

which is a relative mass flow rate,
        G max-' is a maximum flow rate,
        n is degree of g equal to 1.43.

2. A method of measuring a mass flow rate of a fluid, comprising the steps of providing a housing with two hollow pipes communicating with one another and having a fluid inlet and a fluid outlet;
    exciting vibrations in said hollow pipes of said housing by an electromagnetic excitation unit;
    associating two electromagnetic adapters correspondingly with said two pipes of said housing and providing by them signals which are proportional to a speed of vibrations of said pipes of said housing; and
    connecting an electronic block with said electromagnetic excitation unit and with said electromagnetic adapters by the electronic block a mass flow rate of a fluid, a correction associated with inclusion in the fluid and constituted by a ratio of a voltage amplitude of said adapters and a voltage amplitude of excitation of vibrations by said electromagnetic excitation unit, and a corrected mass flow rate of the liquid based on said determined mass flow and said determined correction,
    wherein said determining said correction includes determining said correction, in which an argument of a function of said correction is:

$$X = \frac{A}{A_o} - 1$$

wherein X is argument of a function of the correction,
        A is ratio of voltage amplitude on the adapters to excitation voltage when there are inclusions in the fluid, and
        Ao is a ratio of voltage amplitude on the adapters to excitation voltage when there are no inclusions in the fluid,
    wherein said determining the corrected mass flow rate includes determining the corrected mass flow rate as follows:

$$Go = G[1 + \beta(X)]$$

wherein Go is the corrected mass flow rate,
        G is the determined flow rate before correction, and e (X) is error caused by inclusions, wherein determining the error caused by inclusions includes determining the error caused by inclusion as follows:

$$e(X) = aX(c-X) - bX\frac{d-X^2}{gn}$$

wherein a, b, c, d are constant coefficients which depend on type and size of sensors, $$g = \frac{G_o}{G_{max}}$$

which is a relative mass flow rate, G max is a maximum flow rate, n is degree of g equal to 1.43.

* * * * *